(12) United States Patent
Sakai et al.

(10) Patent No.: US 7,034,447 B2
(45) Date of Patent: Apr. 25, 2006

(54) DISCHARGE LAMP WITH CONDUCTIVE MICRO-TIPS

(75) Inventors: Tadashi Sakai, Yokohama (JP); Tomio Ono, Yokohama (JP); Naoshi Sakuma, Yokohama (JP); Mariko Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 325 days.

(21) Appl. No.: 10/657,197

(22) Filed: Sep. 9, 2003

(65) Prior Publication Data

US 2004/0061429 A1 Apr. 1, 2004

(30) Foreign Application Priority Data

Sep. 26, 2002 (JP) .............................. 2002-280294

(51) Int. Cl.
*H01J 63/04* (2006.01)
(52) U.S. Cl. ....................................... 313/491; 313/623
(58) Field of Classification Search ........ 313/491–492, 313/623, 633, 637
See application file for complete search history.

(56) References Cited

U.S. PATENT DOCUMENTS

| 6,469,425 | B1 | 10/2002 | Sakai et al. | |
|---|---|---|---|---|
| 2002/0171357 | A1* | 11/2002 | Sun et al. | 313/491 |
| 2004/0061429 | A1 | 4/2004 | Sakai et al. | |

FOREIGN PATENT DOCUMENTS

| JP | 4-274156 | 9/1992 |
|---|---|---|
| JP | 8-236083 | 9/1996 |
| JP | 2002-117771 | 4/2002 |
| JP | 2002-298777 | 10/2002 |
| JP | 2003-132850 | 5/2003 |

OTHER PUBLICATIONS

U.S. Appl. No. 10/098,571, filed Mar. 18, 2002, Sakai et al.
U.S. Appl. No. 11/140,222, filed May 31, 2005, Sakai et al.
M. Stammler, et al., "Field Emission Measurements with Micrometre Resolution on Carbon Nanostructures", Diamond and Related Materials, vol. 8 (1999), pp. 792-797, no month.
Ken Okano, et al., "Low-Threshold Cold Cathodes made of Nitrogen-Doped Chemical-Vapour-Deposited Diamond", Nature, vol. 381, May 9, 1996, pp. 140-141.

* cited by examiner

*Primary Examiner*—Joseph Williams
(74) *Attorney, Agent, or Firm*—Oblon, Spivak, McClelland, Maier & Neustadt, P.C.

(57) ABSTRACT

A discharge lamp having an enclosure in which a discharging gas is sealed, and a pair of electron-emitting members sealed in the enclosure and between which a voltage is applied. Each electron-emitting member has, at its surface, a plurality of conductive micro-tips and an electron-emitting film which supports the plurality of conductive micro-tips and is made of a material whose secondary emission efficiency is higher than that of the material for the conductive micro-tips with respect to the discharging gas.

27 Claims, 3 Drawing Sheets

DISCHARGE LAMP WITH CONDUCTIVE MICRO-TIPS

CROSS-REFERENCE TO RELATED APPLICATIONS

This application is based upon and claims the benefit of priority from the prior Japanese Patent Application No. 2002-280294, filed Sep. 26, 2002, the entire contents of which are incorporated herein by reference.

BACKGROUND OF THE INVENTION

1. Field of the Invention

This invention relates to a discharge lamp, and more particularly to a cold cathode discharge lamp with lower power consumption.

2. Description of the Related Art

Discharge lamps, which account for about half of the illumination sources, are a very important technical field from the viewpoint of industry and people's everyday lives. Recently, a sharply increasing number of cold cathode discharge lamps have been produced as backlight sources for liquid-crystal displays.

One known cold cathode discharge lamp is a cold cathode fluorescent lamp. In this lamp, two cold cathodes are placed in a glass tube in such a manner they face each other. In the glass tube, a noble gas and a trace amount of Hg are sealed (for example, as disclosed in Jpn. Pat. Appln. KOKAI Publication No. 4-274156). A high voltage is applied between the two cold cathodes, thereby starting a discharge between the two electrodes. Sustaining the discharge causes ultraviolet rays to be emitted as a result of the excitation of mercury, thereby causing the fluorescent material to emit light. Another known cold cathode discharge lamp is a barrier cold cathode discharge lamp. In this lamp, an electrode is provided outside the tube where a discharging space is formed. The electrode does not make direct contact with the discharging face (for example, as disclosed in Jpn. Pat. Appln. KOKAI Publication No. 8-236083).

Such cold cathode discharge lamps have the advantages that the breaking of the heating filament and the consumption of the electron-emitting emitter are less and the service life is much longer than conventional hot cathode fluorescent lamps. For this reason, they have found an increasing number of applications in the field of illumination for industrial apparatuses whose light sources are difficult to replace. A sharply increasing number of cold cathode discharge lamps have recently been produced particularly as backlights for liquid-crystal displays. On the other hand, lamps of the cold cathode type are at a disadvantage in that they have a lower light-emission efficiency than those of the hot cathode type. If the light-emission efficiency is increased, they will be able to replace the existing fluorescent lamps in the field of illumination not only for industrial apparatuses but also for general-purpose apparatuses.

To improve the performance of a cold cathode discharge lamp, the inventors have devised a cold cathode discharge lamp using diamond as an electron-emitting material for cathodes as disclosed in Jpn. Pat. Appln. KOKAI publication No. 2002-298777 and No. 2003-132850. Since diamond has a high electron emission efficiency and a high sputter resistance, a discharge lamp with a high light emission efficiency and a long service life can be provided. The technique for using diamond for cold cathodes and emitting electrons in a vacuum has been already established (refer to, for example, K. Okano, et al., "Low-threshold cold cathodes made of nitrogen-doped chemical-vapour-deposited diamond," Nature, Macmillan, 1996, Vol. 381, p. 14).

Another example of using diamond for discharging is a plasma display panel (for example, as disclosed in Jpn. Pat. Appln. KOKAI Publication No. 2002-117771). In this reference concerning a plasma display panel, covering the surface of diamond particles with an amorphous carbon layer improves the electron emitting characteristic and the light emission efficiency.

In each of the cold cathode discharge lamps, applying a specific voltage to the electrodes causes a discharge to start in the discharge tube. Then, the discharging state is sustained, thereby emitting light. Conventional cold cathode discharge lamps have disadvantages in that the voltage applied to start discharge and the voltage to sustain the discharging state are not low and therefore the power consumption is high. Therefore, the realization of a discharge lamp with a higher light emission efficiency and a lower power consumption has been desired.

BRIEF SUMMARY OF THE INVENTION

According to a first aspect of the present invention, there is provided a discharge lamp comprising an enclosure in which a discharging gas is sealed, and a pair of electron-emitting members sealed in the enclosure between which a voltage is applied, each of the electron-emitting members comprising, at its surface, a plurality of conductive micro-tips and an electron-emitting film which supports the plurality of conductive micro-tips and is made of a material whose secondary emission efficiency is higher than that of the material for the conductive micro-tips with respect to the discharging gas.

According to a second aspect of the present invention, there is provided a discharge lamp comprising an enclosure in which a discharging gas is sealed, a pair of electrodes placed in the enclosure on each of which an electron-emitting member is provided, the electron-emitting member comprising, at its surface, a plurality of conductive micro-tips and an electron-emitting film which supports the plurality of conductive micro-tips and is made of a material whose secondary emission efficiency is higher than that of a material for the conductive micro-tips with respect to the discharging gas, and a pair of leads which draw the pair of electrodes outside the enclosure.

According to a third aspect of the present invention, there is provided a discharge lamp comprising an enclosure in which a discharging gas is sealed, a pair of electrodes placed on an outside surface of the enclosure, a pair of electron-emitting members which is formed on an inside face of the enclosure facing the pair of electrodes via the enclosure, each of the electron-emitting members comprising, at its surface, a plurality of conductive micro-tips and an electron-emitting film which supports the plurality of conductive micro-tips and is made of a material whose secondary emission efficiency is higher than that of a material for the conductive micro-tips with respect to the discharging gas.

DETAILED DESCRIPTION OF THE INVENTION

In a discharge lamp explained in embodiments described below, an electron-emitting member provided on an electrode has a cluster of conductive micro-tips and an electron-emitting film which supports the cluster of conductive micro-tips and is made of a material whose secondary emission efficiency is higher than that of the material for the cluster of conductive micro-tips with respect to the discharging gas. In such a configuration, since an electric field concentrates on the tips of the cluster at the start of discharging and electrons are emitted easily from the tips to the discharging space, discharging can be started at a low voltage. Furthermore, since the electron-emitting film supporting the cluster of conductive micro-tips is provided at its root, ions and the like in the discharging space enter the electron-emitting film after the discharge starts. Since the electron-emitting film is made of a material whose secondary emission efficiency is higher than that of the material for the cluster of conductive micro-tips with respect to the discharging gas, many secondary electrons are emitted due to the ions and the like entering the film, which makes it possible to sustain low-power discharge with a high light emission efficiency. Therefore, it is possible to provide a discharge lamp with a high light emission efficiency and a lower power consumption.

Additionally, in a discharge lamp where an electrode is provided on the outside surface of an enclosure and an electron-emitting member is provided on the inside face of the enclosure in such a manner that the member faces the electrode via the enclosure, since the electron-emitting member has a cluster of conductive micro-tips and an electron-emitting film which supports the cluster of conductive micro-tips and is made of a material whose secondary emission efficiency is higher than that of the material for the cluster of conductive micro-tips with respect to the discharging gas, discharging can be started at a low voltage and low-power discharging with a high light emission efficiency can be sustained. Therefore, it is possible to provide a discharge lamp with a high light emission efficiency and a lower power consumption.

Hereinafter, referring to the accompanying drawings, embodiments of the present invention will be explained in detail.

FIRST EMBODIMENT

Figure 1A:
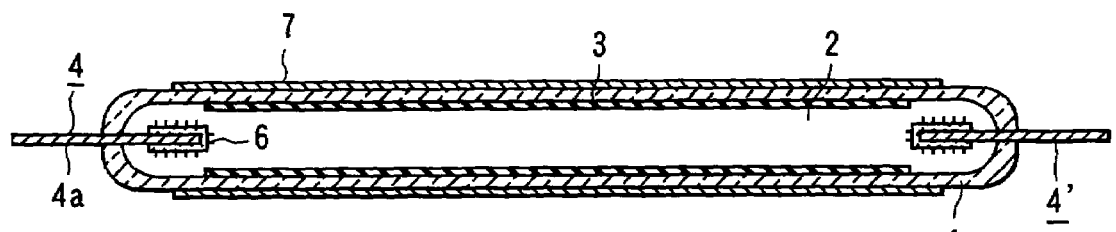
FIG. 1A is a sectional view showing the configuration of a discharge lamp according to a first embodiment of the present invention.
Figure 1B:
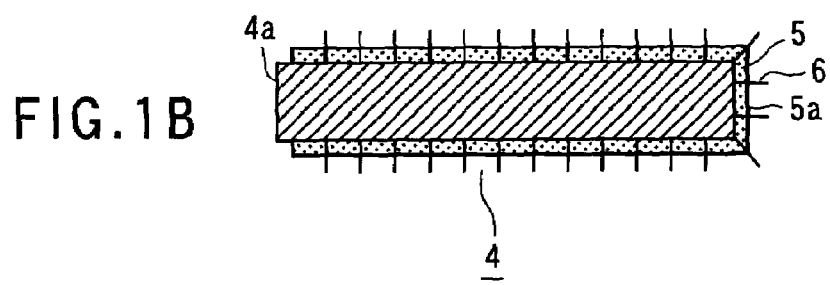
FIG. 1B is an enlarged sectional view of an electrode in FIG. 1A.

FIGS. 1A and 1B are sectional views showing the configuration of a discharge lamp according to a first embodiment of the present invention. As shown in the figures, the discharge lamp includes a glass tube 1 to which fluorescent material 3 has been applied, a pair of electrodes 4 and 4' (cold cathodes) provided at both ends of the glass tube 1, a transparent conducting film 7 (e.g., ITO (indium tin oxide) or $SnO_2$ (tin oxide)) provided on the outside surface of the glass tube 1. A discharging gas is sealed in the inside 2 of the glass tube 1. For instance, in the glass tube 1, argon or mixed noble gases (such mixed gases as argon, neon, and xenon) and a trace amount of mercury are sealed at a pressure of 4 to 80 hPa. To increase the secondary emission efficiency of a diamond film, 0.1 to 10% hydrogen may be mixed into the discharging gas.

Each of the pair of electrodes 4 and 4' has an electrode member 4a made of tungsten (W) as shown in the enlarged view of FIG. 1B. On the surface of the electrode member 4a, a diamond film 5, carbon including SP3 hybrid orbital bonds, is formed as an electron-emitting film. At the surface of the diamond film 5, a cluster of carbon nanotubes 6, carbon including SP2 hybrid orbital bonds, are formed as a cluster of conductive micro-tips. A part of each of the cluster of carbon nanotubes 6 is embedded in the diamond film 5. The diameter of the cluster of carbon nanotubes 6 is 100 nm or less. Its aspect ratio (length/diameter) is 3:1 or more and 1000:1 or less. If the diameter is larger than 100 nm, this makes it difficult to decrease the firing voltage remarkably, which becomes a problem. If the aspect ratio is less than 3:1, the effect is insufficient. If the aspect ratio is larger than 1000:1, the tip structure is liable to break.

With such a configuration, the cluster of carbon nanotubes 6 are supported at the surface of the diamond film 5. The surface 5a of the diamond film 5 where the cluster of carbon nanotubes 6 do not exist is exposed to the inside 2 of the glass tube 1. The diamond film 5 is formed of a material whose secondary emission efficiency is higher than that of the material for the cluster of carbon nanotubes 6 with respect to the discharging gas. The secondary emission efficiency can be measured by discharging characteristic evaluation. The secondary emission efficiency of carbon nanotubes, for example, is 0.01 or less and that of diamond is 0.1 or less with respect to Ar gas.

Next, the operation of the discharge lamp of the first embodiment will be explained.

First, to start discharging, a high voltage of, for example, 1500 V is applied between the pair of electrodes 4 and 4'. Generally, an alternating current is applied between the electrodes 4 and 4' in order to effect discharging. When one of the electrodes 4 and 4' acts as an emitter (or a cathode), the other acts as the opposite electrode (or an anode). When the voltage starts to be applied, the inside of the glass tube 1 is in the insulating state. As a result, the voltage applied to the electrodes 4 and 4' at both ends causes an electric field to concentrate at the tips of the cluster of carbon nanotubes at the surface of the cathode, thereby producing a high electric field locally. The electrons emitted from the cathode move to the opposite electrode (or anode), which starts discharging. In the first embodiment, discharging can be started at a much lower applied voltage than when the cluster of carbon nanotubes 6 are not provided.

As a result of the discharging, electrons collide with mercury atoms sealed in the glass tube 1. The mercury atoms receive energy as a result of the collision and emit ultraviolet light. The ultraviolet light excites the fluorescent material 3, thereby emitting visible light. The color of emitted light varies, depending on the kind of fluorescent material. Various colors of light, including white, daylight, and blue, are emitted from the lamp.

Next, once the discharging has started, the glass tube 1 is filled with ionized gases, which weakens the electric field concentrating effect by the geometric shape in such an insulating space. As a result, electrons are mainly emitted by secondary emission caused by the approach and the collision of discharged gas ions (noble gas ions, such as Ar) to or with the cathode. The easiness of electron emission at that time depends largely on the electronic structure of the cathode surface material, particularly on the electron affinity, not on the shape.

The electron-emitting film, such as the diamond film 5, has a wide bandgap and a low electron affinity and is made of a wide gap semiconductor, such as diamond, whose secondary emission efficiency is higher than that of the material for the cluster of conductive micro-tips (such as the cluster of carbon nanotubes 6). At the surface of the electrodes 4 and 4', the surface 5a of the diamond film 5 and the cluster of carbon nanotubes 6 are arranged in parallel. Consequently, after discharging is started, discharged gas ions approach or collide with the surface 5a of the diamond film 5, which enables secondary electrons to be emitted efficiently from the surface 5a of the diamond film 5. This makes it possible to decrease the voltage for sustaining the discharging. A combination of the above configurations enables both the firing voltage and the self-sustaining discharge voltage to be reduced, which realizes a lower-power-consumption cold cathode discharge lamp.

At this time, the transparent film 7 provided along the glass tube 1 prevents the voltage from dropping in the important part of the glass tube 1 in the longitudinal direction, which makes it possible to distribute much of the potential drop or electric field in the vicinity of the cathode. Combining this effect enables the firing voltage and the self-sustaining discharge voltage to be reduced more effectively.

Furthermore, a combination of diamond and carbon nanotubes used in the first embodiment is much less sputtered by the attack of noble gas, such as Ar, which is the main factor determining the service life of the cold cathode. For instance, the sputtering rate for the attack of Ar ions is as small as about one-tenth of that of Ni conventionally used. Furthermore, Hg vapor and carbon-based material (diamond and carbon nanotubes or the like) used together with noble gas in many discharge tubes make no alloy, such as amalgam, and consume less Hg vapor as a result of being caught. These characteristics further help lengthen the service life of the discharge lamp and reduce the amount of Hg enclosed.

Figure 2A:
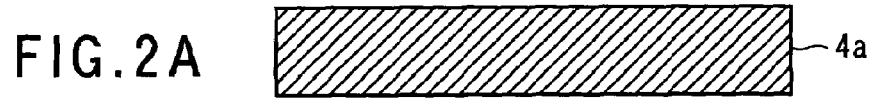
FIGS. 2A to 2C are sectional views showing, step by step, a discharge lamp electrode manufacturing method according to the first embodiment.
Figure 2B:
Figure 2C:

Next, a method of manufacturing a discharge lamp of the first embodiment will be explained. FIGS. 2A to 2C are sectional views of an electrode to help explain the manufacturing method step by step.

As shown in FIG. 2A, an electrode member 4a made of, for example, tungsten (W) is prepared. Next, diamond fines whose particle diameter is about 100 nm and carbon nanotubes whose diameter is 100 nm or less and whose aspect ratio (length/diameter) is 3:1 or more and 1000:1 or less are suspended in an organic solvent (e.g., acetone). The electrode member 4a is immersed in the suspension, followed by an ultrasonic process. By this process, what is called diamond growth seed planting (where no seed is shown) is effected and then the carbon nanotubes 6 are left at the surface of the electrode member 4a as shown in FIG. 2B.

Next, on the surface of the electrode member 4a subjected to the above process, a diamond film 5 is formed by microwave CVD techniques (FIG. 2C). The film formation conditions are as follows: the microwave power was 4 kW, the reactive gas pressure is 40 hPa, the flow rate of hydrogen gas is 400 sccm, the flow rate of methane gas is 4 sccm, the temperature of the substrate is 850° C., and the film formation time is 60 minutes. At this time, it is desirable that such doping gas as boron or phosphorus should be added in addition to methane or hydrogen to form a conductive film. Furthermore, adding a high-concentration nitrogen gas causes a graphite-like conductive intermediate phase to be produced intentionally, which improves the conductivity of the film. By the aforementioned processes, it is possible not only to form the diamond film 5 but also effect the anchoring of the carbon nanotubes 6 to the diamond film 5, which simplifies the processes.

Next, a pair of electrodes 4 and 4' formed in the above processes is sealed together with discharging gas into the glass tube 1 on whose inside face the fluorescent material 3 is formed. On the outside surface of the glass tube 1, a transparent conducting film 7 is formed, which completes a discharge lamp.

A pair of electrodes 4 and 4' in the embodiment may be formed as follows. FIGS. 3A to 3D are sectional views of one electrode, showing, step by step, a method of manufacturing the electrodes.

Figure 3A:
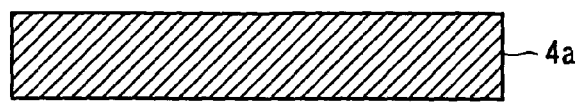
FIGS. 3A to 3D are sectional views showing, step by step, another discharge lamp electrode manufacturing method according to the first embodiment.
Figure 3B:
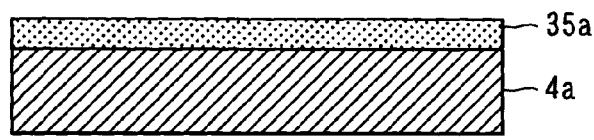

First, as shown in FIG. 3A, an electrode member 4a made of tungsten (W) or the like is prepared. Then, as shown in FIG. 3B, only a diamond film 35a is formed. The film forming conditions are as follows: the microwave power is 4 kW, the reactive gas pressure is 40 hPa, the flow rate of hydrogen gas is 400 sccm, the flow rate of methane gas is 4 sccm, the temperature of the substrate is 850° C., and the film formation time is 60 minutes.

Figure 3C:
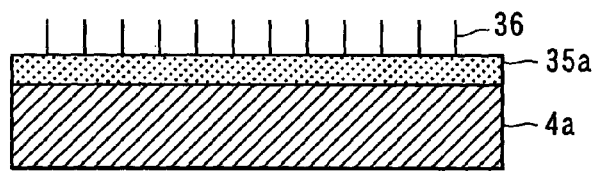

Next, as shown in FIG. 3C, in the same method as described above, the surface of the diamond film 35a is immersed in an organic solvent in which diamond fines and carbon nanotubes are suspended lightly, which leaves a cluster of carbon nanotubes 36 discretely at the surface of the diamond film 35a.

Figure 3D:
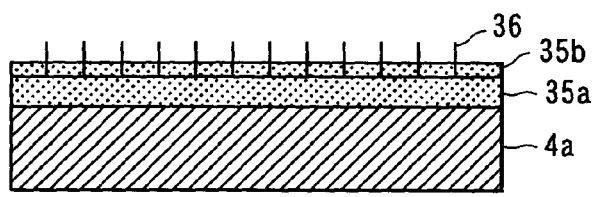

Next, as shown in FIG. 3D, a diamond film 35b is formed by microwave CVD techniques or the like. The film forming conditions are the same as those for the step of FIG. 2C. This makes it possible not only to form the diamond film 35b but also anchor the cluster of carbon nanotubes 36 to the diamond film 35b, which simplifies the processes. By this method, the cluster of carbon nanotubes 36 can be anchored to the diamond film 35b more reliably. In a discharge lamp formed by this method, the carbon nanotubes are secured firmly, which not only makes the carbon nanotubes stable but also prevents the carbon nanotubes from coming off even when the surface of the diamond is worn away to some extent. Consequently, a long service life can be achieved.

Furthermore, the carbon nanotubes may be formed directly at the surface of the diamond film as follows: after the diamond film is formed, the diamond film is immersed in a solvent (e.g., ethanol) in which catalytic metal, such as Fe, is distributed very lightly; then, CVD techniques are applied using methane gas or the like at a lower temperature than that of diamond, thereby forming the carbon nanotubes directly at the surface of the diamond film. By this method, the orientation or distribution of the carbon nanotubes can be controlled minutely. A discharge lamp formed by this method has the effect of providing a good reproducibility of the discharging characteristic.

SECOND EMBODIMENT

Figure 4A:
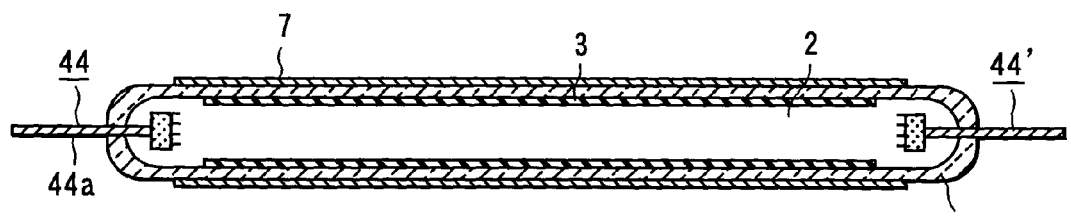
FIG. 4A is a sectional view showing the configuration of a discharge lamp according to a second embodiment of the present invention.
Figure 4B:
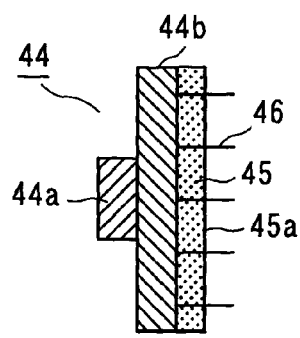
FIG. 4B is an enlarged sectional view of an electrode in FIG. 4A.

FIGS. 4A and 4B are sectional views showing the configuration of a discharge lamp according to a second embodiment of the present invention. The same parts as those in FIGS. 1A and 1B are indicated by the same reference numerals.

As shown in FIGS. 4A and 4B, the discharge lamp according to the second embodiment includes a glass tube 1 to which fluorescent material 3 has been applied, a pair of electrodes 44 and 44' (cold cathodes) provided at both ends of the glass tube 1, and a transparent conducting film 7 provided on the outside surface of the glass tube 1. In the inside 2 of the glass tube 1, a discharging gas is sealed. To increase the secondary emission efficiency of a diamond film, 0.1 to 10% hydrogen may be mixed into the discharging gas.

Each of the pair of electrodes 44 and 44' has an electrode plate 44b made of tungsten (W) or the like at the tip of a lead-out electrode 44a as shown in the enlarged view of FIG. 4B. On the surface of the electrode plate 44a, a diamond film 45 is formed as an electron-emitting film. At the surface of the diamond film 45, a cluster of carbon nanotubes 46 are formed as a cluster of conductive micro-tips. A part of each of the cluster of carbon nanotubes 46 is embedded in the diamond film 45. The diameter and the aspect ratio (length/diameter) of the cluster of carbon nanotubes 46 are the same as those in the first embodiment.

Figure 5:
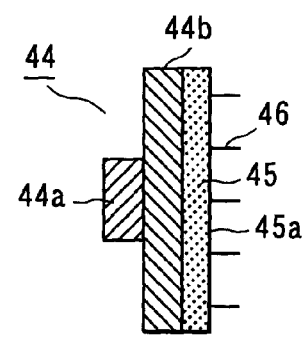
FIG. 5 is a sectional view of an electrode showing a modification of the second embodiment.

The root portion of each of the cluster of carbon nanotubes 46 may be formed on the diamond film 45 as shown in FIG. 5. This is realized as follows: after a diamond film is formed, the diamond film is immersed in a solvent (e.g., ethanol) in which catalytic metal, such as Fe, is distributed very lightly; then, CVD techniques are applied using methane gas or the like at a lower temperature than that of diamond, thereby forming the carbon nanotubes directly at the surface of the diamond film. By this method, the orientation or distribution of the carbon nanotubes can be controlled minutely. A discharge lamp formed by this method has the effect of providing a good reproducibility of the discharging characteristic.

With the above configuration, the cluster of carbon nanotubes 46 are supported at the surface of the diamond film 45. The surface 45a of the diamond film 45 where the cluster of carbon nanotubes 46 do not exist is exposed to the inside 2 of the glass tube 1. The diamond film 45 is formed of a material whose secondary emission efficiency is higher than that of the material for the cluster of carbon nanotubes 46.

With the discharge lamp of the second embodiment, both the firing voltage and the self-sustaining discharge voltage can be reduced as in the first embodiment, which realizes a lower-power-consumption cold cathode discharge lamp. Furthermore, Use of the electrode plate 44 makes it possible to form a lot of cathodes at a large-area substrate at the same time and then divide the cathodes into individual cathodes for use. Therefore, the cathode manufacturing processes can be adjusted for mass production.

THIRD EMBODIMENT

Figure 6B:
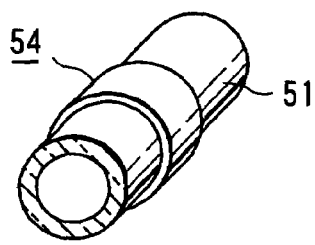
FIG. 6B is an enlarged view of one external electrode in FIG. 6A.
Figure 6C:
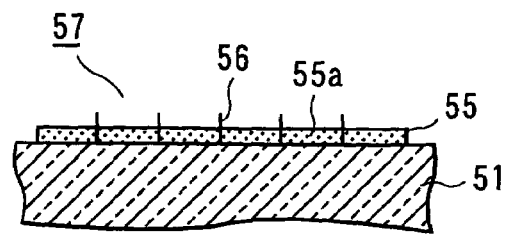
FIG. 6C is an enlarged view of one internal electrode in FIG. 6A.
Figure 6A:
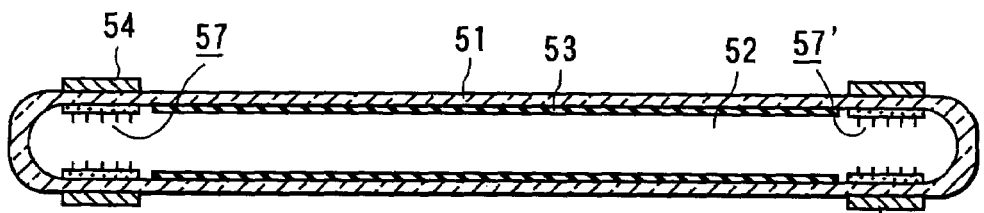
FIG. 6A is a sectional view showing the configuration of a discharge lamp according to a third embodiment of the present invention.

Next, a third embodiment of the present invention will be explained. FIGS. 6A to 6C are sectional views showing the configuration of a discharge lamp according to the third embodiment. The discharge lamp of the third embodiment is a barrier discharge lamp. In the barrier discharge lamp, electrodes are provided on the outside surface of the discharge tube. A voltage is applied to the electrodes, giving rise to discharge inside the discharge tube, which emits light.

As shown in FIGS. 6A and 6B, the discharge lamp of the third embodiment includes a glass tube 51 to which fluorescent material 53 has been applied and a pair of cylindrical electrodes 54 and 54' (or cold cathodes) provided on the outside surface of both ends of the glass tube 51. In the inside 52 of the glass tube 51, a discharging gas is sealed. For instance, in the glass tube 51, argon or mixed noble gases (such mixed gases as argon, neon, and xenon) is sealed at a pressure of 80 hPa. To increase the secondary emission efficiency of a diamond film, 0.1 to 10% hydrogen may be mixed into the discharging gas.

On the inside face of the glass tube 51 facing the pair of electrodes 54, 54' via the glass tube 51, there is provided a pair of cylindrical electron-emitting members 57 and 57'. Each of the pair of the electron-emitting members 57 and 57' has a configuration as shown in an enlarged view in FIG. 6C. On the inside face of the glass tube 51, a diamond film 55 is formed as an electron-emitting film. In the third embodiment, conductivity is not necessarily given to the diamond film. The diamond film may be insulating. At the surface of the diamond film 55, a cluster of carbon nanotubes 56 are formed as a cluster of conductive micro-tips. A part of each of the cluster of carbon nanotubes 56 is embedded in the diamond film 55. The diameter of the cluster of carbon nanotubes 56 is 100 nm or less. Its aspect ratio (length/diameter) is 3:1 or more and 1000:1 or less. If the diameter is larger than 100 nm, this makes it difficult to decrease the firing voltage remarkably, which becomes a problem. If the aspect ratio is less than 3:1, the effect is insufficient. If the aspect ratio is larger than 1000:1, the tip structure is liable to break.

With such a configuration, the cluster of carbon nanotubes 56 are supported at the surface of the diamond film 55. The surface 55a of the diamond film 55 where the cluster of carbon nanotubes 56 do not exist is exposed to the inside 52 of the glass tube 51. The diamond film 55 is formed of a material whose secondary emission efficiency is higher than that of the material for the cluster of carbon nanotubes 56 with respect to the discharging gas.

Next, the operation of the barrier discharge lamp of the third embodiment will be explained.

First, to start discharging, a high-frequency voltage with 40 kHz and 1500 V is applied between the pair of electrodes 54 and 54'. When one of the electrodes 54 and 54' acts as an emitter (or a cathode), the other acts as the opposite electrode (or an anode). When the high-frequency voltage is applied, an electric field concentrates on the tips of the cluster of carbon nanotubes 56 at the surface of the cathode in the space 52 between the insulating glass walls (called barrier layers), thereby producing a high electric field locally. The electrons emitted from the cathode due to the high electric field move to the opposite electrode (or anode), which starts discharging. In the third embodiment, discharging can be started at a much lower applied voltage than when the cluster of carbon nanotubes 6 are not provided.

The above mechanism produces intermittent discharge. Ultraviolet light caused by the intermittent discharge excites the fluorescent material, thereby emitting light. As described above, in the barrier discharge lamp, the electrodes 54 and 54' are not exposed in the discharging space, suppressing the consumption of the electrodes 54 and 54', which makes it unnecessary to cause mercury vapor to exist in the glass tube 51. Therefore, only noble gas is used as a gas sealed in the glass tube 51.

Next, once the discharging has started, the glass tube 51 is filled with ionized gases, which weakens the electric field concentrating effect by the geometric shape in such an insulating space. As a result, electrons are mainly emitted by secondary emission caused by the approach or the collision of discharged gas ions (noble gas ions, such as Ar) to or with the cathode. The easiness of electron emission at that time depends largely on the electronic structure of the cathode surface material, particularly on the electron affinity, not on the shape.

The electron-emitting film, such as the diamond film 55, has a wide bandgap and a low electron affinity and is made of a wide gap semiconductor, such as diamond, whose secondary emission efficiency is higher than that of the material for the cluster of conductive micro-tips (such as the cluster of carbon nanotubes 56) with respect to the discharging gas. At the surface of the electrode-emitting members 57 and 57', the surface 55a of the diamond film 55 and the cluster of carbon nanotubes 56 are arranged in parallel.

As a result, after discharging is started, discharged gas ions approach or collide with the surface 55a of the diamond film 55, which enables secondary electrons to be emitted efficiently from the surface 55a of the diamond film 55. This makes it possible to decrease the voltage for sustaining the discharging. A combination of the above configurations enables both the firing voltage and the self-sustaining discharge voltage to be reduced, which realizes a lower-power-consumption cold cathode discharge lamp.

FOURTH EMBODIMENT

Figure 7A:
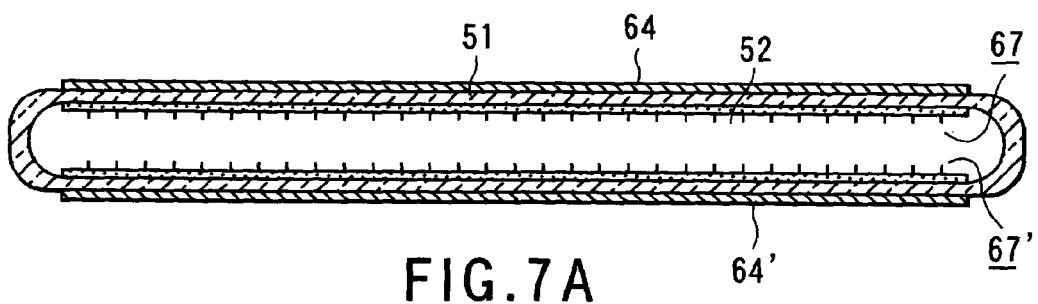
FIG. 7A is a sectional view showing the configuration of a discharge lamp according to a fourth embodiment of the present invention.
Figure 7B:
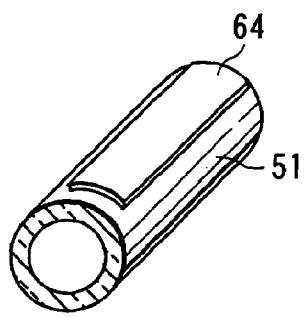
FIG. 7B is an enlarged view of one external electrode in FIG. 7A.
Figure 7C:
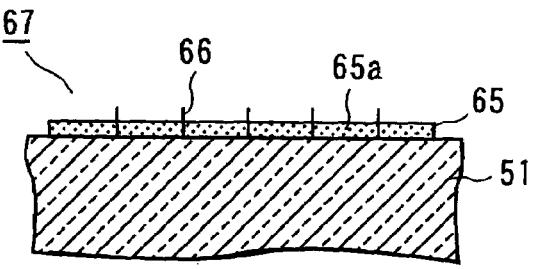
FIG. 7C is an enlarged view of one internal electrode in FIG. 7A.

Next, a fourth embodiment of the present invention will be explained. FIGS. 7A to 7C are sectional views showing the configuration of a discharge lamp according to the fourth embodiment. The discharge lamp of the fourth embodiment is a barrier discharge lamp. In the barrier discharge lamp, a pair of electrodes is provided on the outside surface of the discharge tube in the longitudinal direction. The same parts as those in FIGS. 6A to 6C are indicated by the same reference numerals.

As shown in FIGS. 7A to 7C, the discharge lamp of the fourth embodiment includes a glass tube 51 and a pair of electrodes 64 and 64' (cathodes) provided on the outside surface of the glass tube 51. Each of the pair of electrodes 64 and 64' is provided on the outside surface of the glass tube 51 in the form of a stripe in the longitudinal direction in such a manner that the electrodes 64 and 64' face each other. As in the third embodiment, a discharging gas is sealed in the inside 52 of the glass tube 51.

As shown in FIGS. 7A and 7B, on the inside face of the glass tube 51 facing the pair of electrodes 64 and 64', a pair of electron-emitting members 67 and 67' is provided. Each of the pair of electron-emitting members 67 and 67' is provided on the inside face of the glass tube 51 in the form of a stripe in the longitudinal direction in such a manner that the members 67 and 67' face each other. Each of the pair of electron-emitting members 67 and 67' has a configuration as shown in an enlarged view in FIG. 7C. A diamond film 65 is formed as an electron-emitting film on the inside face of the glass tube 51. It is desirable that the diamond film of the fourth embodiment should be insulating or have a high resistance.

At the surface of the diamond film 65, a cluster of carbon nanotubes 66 are formed as a cluster of conductive micro-tips. A part of each of the cluster of carbon nanotubes 66 is embedded in the diamond film 65. The diameter and the aspect ratio (length/diameter) of the cluster of carbon nanotubes 66 are the same as those in the third embodiment. With such a configuration, the cluster of carbon nanotubes 66 are supported at the surface of the diamond film 65. The surface 65a of the diamond film 65 where the cluster of carbon nanotubes 66 do not exist is exposed to the inside 52 of the glass tube 51.

Like the discharge lamp of the third embodiment, the discharge lamp of the fourth embodiment enables both the firing voltage and the self-sustaining discharge voltage to be reduced, which realizes a lower-power-consumption cold cathode discharge lamp. Furthermore, the discharge lamp of the fourth embodiment has a high discharge plasma diffusing power and therefore can be applied to discharging by only noble gas, such as neon or xenon, without using mercury.

The present invention is not limited to the above embodiments. For instance, in addition to the carbon nanotubes, carbon fullerene or carbon onion may be used as carbon including SP2 hybrid orbital bonds used in the cluster of conductive micro-tips. Although diamond has been used as carbon including SP3 hybrid orbital bonds, a material whose secondary emission efficiency is high, diamond-like carbon may be used instead.

Furthermore, the cluster of conductive micro-tips and the electron-emitting film made of a material whose secondary emission efficiency is higher than that of the material for the cluster of conductive micro-tips with respect to the discharging gas may be combined in other ways. For instance, carbon fiber and metal whisker fiber in addition to the aforementioned carbon nanotubes, carbon onion and carbon fullerene as the cluster of conductive micro-tips and aluminum nitride, gallium nitride, boron nitride and a wide gap semiconductor, such as a mixed crystal material made of at least two of the above-mentioned materials in addition to diamond and diamond-like carbon as the electron-emitting film.

To increase the secondary emission efficiency of a diamond film, 0.1 to 10% hydrogen may be mixed into the discharging gas. It is desirable that diamond should contain donor impurities.

It is desirable that the diameter of the cluster of conductive micro-tips should be 100 nm or less and its aspect ratio (length/diameter) should be 3:1 or more and 1000:1 or less.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A discharge lamp comprising:
   an enclosure in which a discharging gas is sealed; and
   a pair of electron-emitting members sealed in the enclosure between which a voltage is applied, each of the electron-emitting members comprising, at a surface thereof, a plurality of conductive micro-tips and an electron-emitting film which supports said plurality of conductive micro-tips and is made of a material whose secondary emission efficiency is higher than that of a material for the conductive micro-tips with respect to the discharging gas.

2. The discharge lamp according to claim 1, wherein said plurality of conductive micro-tips are made of carbon including SP2 hybrid orbital bonds.

3. The discharge lamp according to claim 1, wherein said plurality of conductive micro-tips include at least one selected from the group of carbon nanotubes, carbon fullerene, and carbon onion.

4. The discharge lamp according to claim 1, wherein the electron-emitting film is made of carbon including SP3 hybrid orbital bonds.

5. The discharge lamp according to claim 1, wherein the electron-emitting film is made of diamond.

6. The discharge lamp according to claim 1, wherein said plurality of conductive micro-tips are made of carbon including SP2 hybrid orbital bonds, and the electron-emitting film is made of carbon including SP3 hybrid orbital bonds.

7. The discharge lamp according to claim 1, wherein said plurality of conductive micro-tips include at least one selected from the group of carbon nanotubes, carbon fullerene, and carbon onion, and the electron-emitting film is made of diamond.

8. The discharge lamp according to claim 1, wherein at least a part of said plurality of conductive micro-tips are embedded in the electron-emitting film.

9. The discharge lamp according to claim 1, wherein the discharging gas contains hydrogen.

10. A discharge lamp comprising:
an enclosure in which a discharging gas is sealed;
a pair of electrodes placed in the enclosure on each of which an electron-emitting member is provided, the electron-emitting member comprising, at a surface thereof, a plurality of conductive micro-tips and an electron-emitting film which supports said plurality of conductive micro-tips and is made of a material whose secondary emission efficiency is higher than that of a material for the conductive micro-tips with respect to the discharging gas; and
a pair of leads which draw the pair of electrodes outside the enclosure.

11. The discharge lamp according to claim 10, wherein said plurality of conductive micro-tips are made of carbon including SP2 hybrid orbital bonds.

12. The discharge lamp according to claim 10, wherein said plurality of conductive micro-tips include at least one selected from the group of carbon nanotubes, carbon fullerene, and carbon onion.

13. The discharge lamp according to claim 10, wherein the electron-emitting film is made of carbon including SP3 hybrid orbital bonds.

14. The discharge lamp according to claim 10, wherein the electron-emitting film is made of diamond.

15. The discharge lamp according to claim 10, wherein said plurality of conductive micro-tips are made of carbon including SP2 hybrid orbital bonds, and the electron-emitting film is made of carbon including SP3 hybrid orbital bonds.

16. The discharge lamp according to claim 10, wherein said plurality of conductive micro-tips include at least one selected from the group of carbon nanotubes, carbon fullerene, and carbon onion, and the electron-emitting film is made of diamond.

17. The discharge lamp according to claim 10, wherein at least a part of said plurality of conductive micro-tips are embedded in the electron-emitting film.

18. The discharge lamp according to claim 10, wherein the discharging gas contains hydrogen.

19. A discharge lamp comprising:
an enclosure in which a discharging gas is sealed;
a pair of electrodes placed on an outside surface of the enclosure;
a pair of electron-emitting members which is formed on an inside face of the enclosure facing the pair of electrodes via the enclosure, each of the electron-emitting members comprising, at a surface thereof, a plurality of conductive micro-tips and an electron-emitting film which supports said plurality of conductive micro-tips and is made of a material whose secondary emission efficiency is higher than that of a material for the conductive micro-tips with respect to the discharging gas.

20. The discharge lamp according to claim 19, wherein said plurality of conductive micro-tips are made of carbon including SP2 hybrid orbital bonds.

21. The discharge lamp according to claim 19, wherein said plurality of conductive micro-tips include at least one selected from the group of carbon nanotubes, carbon fullerene, and carbon onion.

22. The discharge lamp according to claim 19, wherein the electron-emitting film is made of carbon including SP3 hybrid orbital bonds.

23. The discharge lamp according to claim 19, wherein the electron-emitting film is made of diamond.

24. The discharge lamp according to claim 19, wherein said plurality of conductive micro-tips are made of carbon including SP2 hybrid orbital bonds, and the electron-emitting film is made of carbon including SP3 hybrid orbital bonds.

25. The discharge lamp according to claim 19, wherein said plurality of conductive micro-tips include at least one selected from the group of carbon nanotubes, carbon fullerene, and carbon onion, and the electron-emitting film is made of diamond.

26. The discharge lamp according to claim 19, wherein at least a part of said plurality of conductive micro-tips are embedded in the electron-emitting film.

27. The discharge lamp according to claim 19, wherein the discharging gas contains hydrogen.

* * * * *